United States Patent [19]

Feinland

[11] Patent Number: 4,864,521
[45] Date of Patent: Sep. 5, 1989

[54] MULTIRANGING SCALE WITH BLANKING OF RATE DISPLAY

[75] Inventor: Seymour Feinland, Stamford, Conn.

[73] Assignee: Pitney Bowes Inc., Stamford, Conn.

[21] Appl. No.: 139,881

[22] Filed: Dec. 30, 1987

[51] Int. Cl.⁴ ..................... G01G 19/413; G06F 11/00
[52] U.S. Cl. ................................. 364/567; 177/25.15; 364/464.03
[58] Field of Search ....................... 364/464.02, 464.03, 364/467; 177/25.14, 25.15, 164, 211, 229

[56] References Cited

U.S. PATENT DOCUMENTS

| | | | |
|---|---|---|---|
| 4,064,954 | 12/1977 | Rock | 364/464.03 |
| 4,135,662 | 1/1979 | Dlugos | 364/464.03 |
| 4,139,892 | 2/1979 | Gudea et al. | 364/464.03 |
| 4,509,608 | 4/1985 | Hikita | 177/25.15 |
| 4,690,230 | 9/1987 | Uchimura et al. | 177/229 |
| 4,696,359 | 9/1987 | Glibbery | 177/211 |
| 4,706,767 | 11/1987 | Chou | 177/164 X |
| 4,778,016 | 10/1988 | Uchimura et al. | 177/164 |

*Primary Examiner*—Felix D. Gruber
*Attorney, Agent, or Firm*—Peter Vrahotes; Melvin J. Scolnick; David E. Pitchenik

[57] ABSTRACT

According to the invention, a multiranging scale which operates in two weighing modes, a high range mode and a low range mode, and which displays not only weight but rate and/or charge information associated with mailing or shipping an article, is inhibited from displaying or outputting a signal indicative of the rate and/or charge when in the high range mode of operation the weight of the article is below a threshold, thereby causing the user to select the low range mode of operation. In addition to inhibiting the rate/charge display an audible or visual signal may be provided to more actively cue the user to switch to the low range weighing mode.

5 Claims, 3 Drawing Sheets

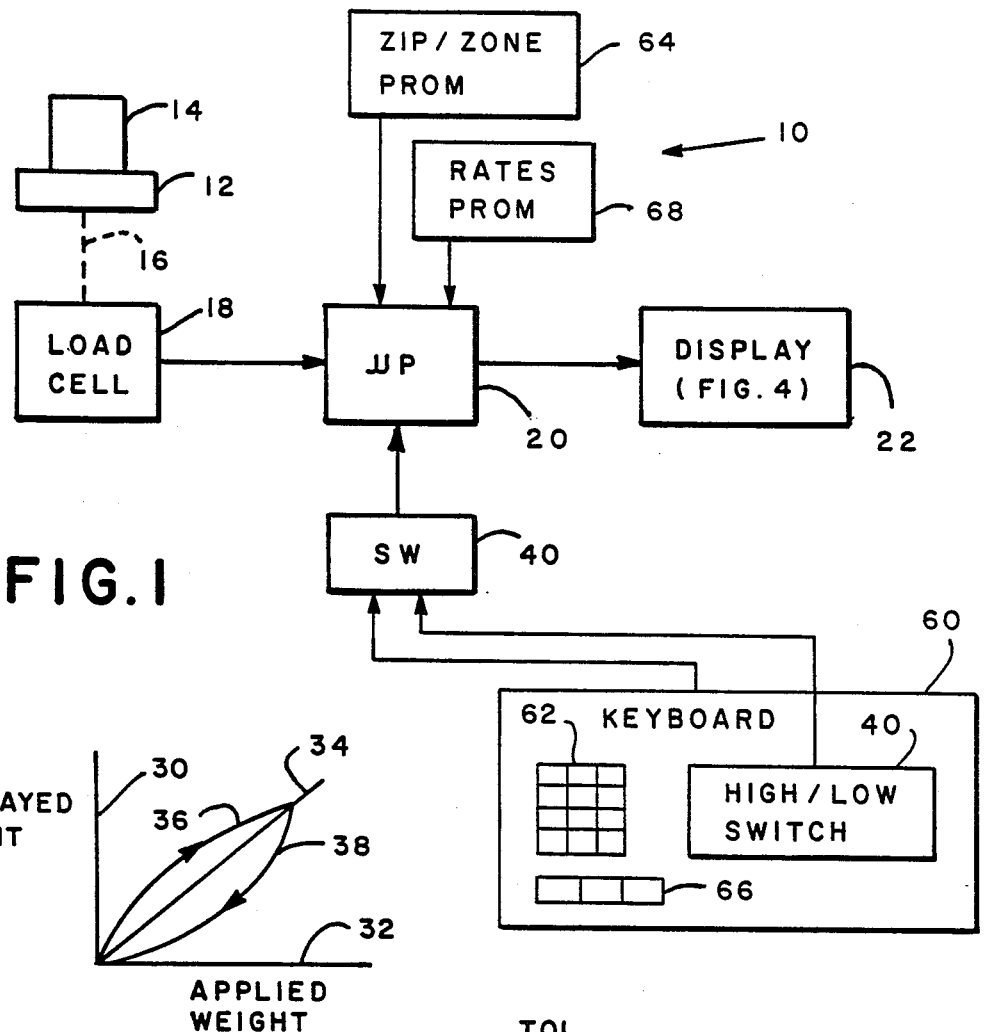
FIG. 1
FIG. 2
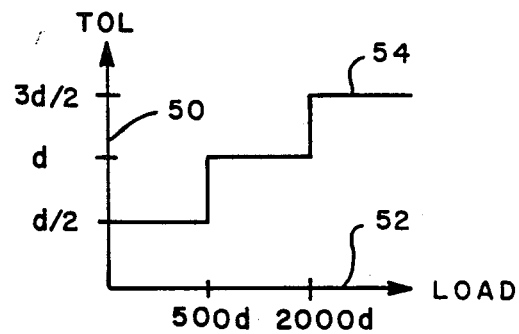
FIG. 3
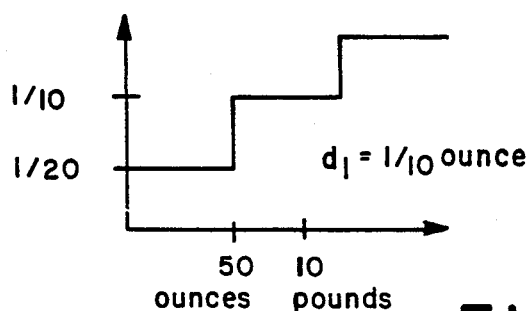
FIG. 3A

MULTIRANGING SCALE WITH BLANKING OF RATE DISPLAY

TECHNICAL FIELD OF THE INVENTION

The invention relates to electronic scales for weighing letters and parcels and, more particularly to scales that also have the capability to calculate postal and shipping fees based on weight.

BACKGROUND OF THE INVENTION

An example of a modern, electronic weighing scale is the HAWK (TM) scale marketed by Pitney Bowes, Inc. of Stamford, Conn. Such a scale is capable of weighing articles, such as letters and parcels, and displaying their weight. Additionally, the scale is operable to calculate and display the monetary charge (e.g. postage) for posting or shipping each article. This is accomplished via rate data tables resident in the scale which are accessed by a microprocessor in the scale. These functions are well known and are accessible to the scale user via a keyboard. For example, a package is weighed and its weight is displayed. A carrier (shipper) is selected by the user and the microprocessor accesses the appropriate rate table to display the charge for shipping an article of that weight. In the interim a destination zone or zip code is typically entered via the keyboard, and may also be displayed by the scale.

Weighing letters as well as packages requires that the scale operate accurately over a wide range of applied loads (article weights). Thus it has been known to provide multirange postal/shipping scales. For example, U.S. Pat. No. 4,690,230 discloses a MULTI-RANGE LOAD CELL WEIGHING INSTRUMENT wherein, as shown in FIG. 4 therein, the output of a low range load cell is continuously monitored, but is not used for weight calculations in excess of 2.5 kilograms in which case the output of a high range load cell is employed. This dual load cell approach carries with it a premium—i.e., additional hardware and calibration costs.

The ultimate object of any multiranging scale is to provide at least two weighing "modes"; a high range mode such as 0-100 pounds, and a low range mode such as 0-10 pounds. However, in the high range mode it becomes extremely difficult to maintain accuracy while weighing at the lower end (near zero) of the high range mode. This problem becomes more poignant in the sale and use of scales which are regulated by state and local bureaus of weights and measures, and becomes more challenging when it is desired to employ low cost load cell technology.

In commonly-owned U.S. Pat. No. (Ser. No. 116936), entitled MULTIRANGING ELECTRONIC WEIGHING SCALE FOR TYPE-APPROVAL, and filed on Nov. 4, 1987 it is proposed that a manually-operable switch be employed on the scale to select between the high and low range weighing modes of operation for reasons pertaining to maintaining the value, d, of the interval between successive scale divisions constant across each of the two weighing ranges, without having d in the low range equal d in the high range. That patent application is hereby incorporated by reference.

In the context of such a manually-switched multiranging scale, the inventor has recognized that a user may, for example, neglect to switch the scale to the low range mode when weighing a lightweight article, such as letter, immediately after having weighed a heavier article, such as a parcel in the high range mode. This becomes a problem when the high range mode is not sufficiently accurate for lightweight letter mail.

Thus, it is an object of this invention to inhibit use of a manually switched multirange scale in the high range mode of operation for weighing lightweight articles, such as letters, thereby encouraging the user to switch to the low range mode for weighing such articles.

SUMMARY OF THE INVENTION

According to the invention, a multiranging scale which operates in two modes, a high range mode and a low range mode, and which displays not only weight but destination and/or charge information associated with mailing or shipping an article, is inhibited from displaying or outputting a signal indicative of the destination and/or charge when in the high range mode of operation the weight of the article is below a threshold, thereby encouraging the user to select the low range mode of operation. In addition to inhibiting the destination/charge display an audible or visual signal may be provided to more actively cue the user to switch to the low range mode.

BRIEF DESCRIPTION OF THE DRAWINGS

FIG. 1 is a schematic of th scale of this invention.

FIG. 2 is a graph of load cell characteristics pertinent to the scale of this invention.

FIG. 3 is a graph of tolerance vs. load criteria in general.

FIG. 3A is a graph of tolerance vs. load criteria for the scale of this invention in a low range mode of operation.

DETAILED DESCRIPTION OF THE INVENTION AND BEST MODE FOR CARRYING OUT SAME

Figure 3B:
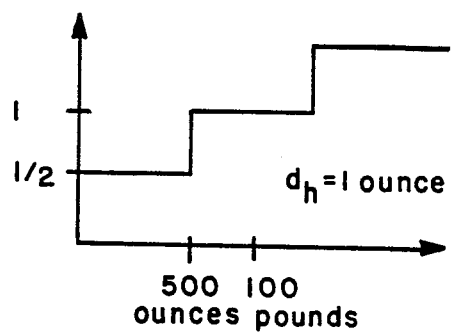
FIG. 3B is a graph of tolerance vs. load criteria for the scale of this invention in a high range mode of operation.

FIG. 1 shows an electronic scale 10 having a platen 12 upon which an article 14, such as a mailpiece or a package is placed for weighing. The platen 12 exerts a force via a linkage 16 on a load cell 18 which, in response thereto, provides a signal to scale circuitry, such as a microprocessor 20. The microprocessor 20 drives a display device 22, such as a digital readout device, to display the weight of the article.

Advantageously, the load cell 18 is a strain gauge based arrangement which is simple and inexpensive to manufacture. However, load cells will inevitably suffer from linearity, hysteresis and creep inaccuracies. Compensating for these inaccuracies is a function of accuracy desired, and could require complex compensation algorithms, such as in software for the microprocessor 20 which could negate any advantage gained by the use of a load cell of moderate cost.

In the exemplary scale described herein, it will be assumed that a moderate cost load cell is employed and, that with a minimum amount of compensation involved, an accuracy of one part in sixteen hundred (1:1600) can be effectively achieved in both of two weighing ranges, a low range and a high range.

FIG. 2 is a graph illustrative of the inaccuracies of the load cell 18, which are shown somewhat exaggerated for descriptive impact. The vertical axis 30 of the graph represents weight displayed by the display device 22, and the horizontal axis 32 of the graph represents the actual (applied) weight of an article 14. Ideally, there is a one-to-one correspondence between the displayed weight and the applied weight, which is represented by the line 34. Errors in the displayed weight as weight is increased from zero to full scale load is represented by the line 36. Errors in the displayed weight as weight is decreased from full scale load to zero is represented by the line 38. The offset between the lines 36 and 38 is referred to as "hysteresis". One skilled in the art to which this invention pertains will recognize that a high ratio of applied load to error is difficult to achieve, even in the lower regions of applied weight, descending. The noncoincidence of the lower end of the descending line 38 with the ideal line 34 is indicative of creep and hysteresis.

Returning to FIG. 1, a manually-operable (by the scale user) switch 40, such as a two position toggle switch or a two-position (on/on) push button on a keyboard, provides a signal to the microprocessor 20 to select between two modes of operation for the scale 10: a "low" weight range mode, such as 0–10 pounds; and a "high" weight range mode, such as 0–100 pounds. This is accomplished by selection between two weighing algorithms by which the microprocessor calculates the weight of the article 14 and drives the display device 22.

For a single load cell to operate with the same accuracy in such a diverse magnitude of ranges would be a difficult accomplishment For instance, maintaining one-tenth ounce accuracy over ten pounds requires only one part in sixteen hundred. Requiring the same (one-tenth ounce) accuracy over one hundred pounds would require maintaining one part in sixteen thousand.

FIG. 3 is a graph illustrative of typical type-approval requirements for a scale. The vertical axis 50 represents tolerance (acceptable deviation in displayed weight with respect to applied weight), and the horizontal axis 52 represents load (applied weight). The units along both axes are in terms of "d", the division or increment between successive weight indications of a particular scale (i.e., apparent accuracy of the scale) As indicated by the staggered line 54, for loads (applied weights) below 500d the tolerance is d/2, for loads from 500d to 2000d the tolerance is d, and for loads in excess of 2000d the tolerance is 3d/2.

Putting the graph of FIG. 3 in perspective with respect to the scale of this invention, FIG. 3A shows the tolerance vs. load criteria which must be met in the low range mode of operation, and FIG. 3B shows the tolerance vs. load criteria which must be met in the high range mode of operation. FIGS. 3A and 3B are discussed hereinafter.

Figure 4:
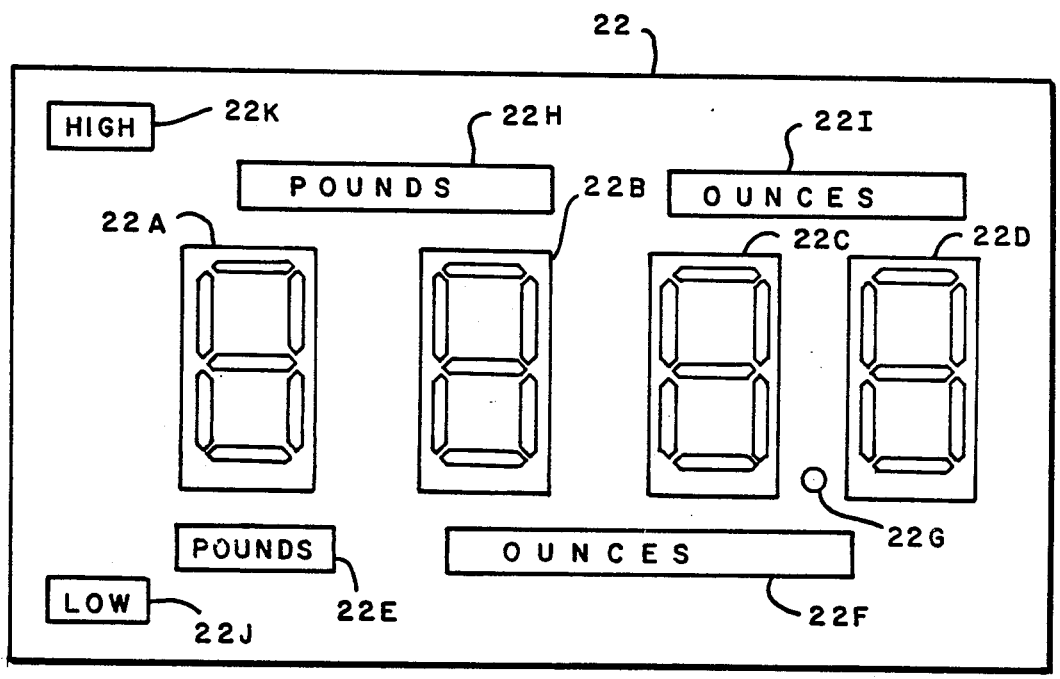
FIG. 4 is a user's-eye view of a display device associated with the scale of FIG. 1.

FIG. 4 shows in greater detail the display device 22 of the scale 10 of FIG. 1. The display 22 includes a four-element digital display for weight. In the low range mode of operation, the display 22 indicates, by a display of 0–9 in each element 22A–22D thereof, "ones" of pounds in the element 22A, "tens" of ounces in the element 22B, "ones" of ounces in the element 22C, and tenths of ounces in the element 22D. In the high range mode of operation, the display indicates "tens" of pounds in the element 22A, "ones" of pounds in the element 22B, "tens" of ounces in the element 22C, and "ones" of ounces in the element 22D.

In addition to the digital display elements 22A–22D, the display device 22 is provided with various elements 22E–22I for cuing the user as to the units of measurement (e.g. pounds, ounces, tenths) being displayed by the display device 22 in the low and high range modes of operation.

For example, in the low range mode, an element 22E which is juxtaposed with, such as beneath, the ("ones" of pounds in the low range mode) element 22A, displays a legend "POUNDS" by becoming visible to the user, such as by illumination of the element 22E. An element 22F juxtaposed below the elements 22B, 22C and 22D (indicating tens, ones and tenths of ounces, respectively in the low range mode) also becomes visible to the user by displaying a legend "OUNCES". An element 22G disposed between the ("ones" of ounces) element 22C and the ("tens" of ounces) element 22D shows a decimal point in the low range mode.

In the high range mode, the elements 22E–22G are extinguished, and the following elements 22H and 22I are made visible to the user as follows (and vice-versa when the low range mode is selected): In the high range mode, an element 22H which is juxtaposed with, such as above, the elements 22A and 22B ("tens" of pounds and "ones" of pounds, respectively, in the high range) displays a legend "POUNDS" to the user. An element 22I which is juxtaposed with the elements 22C and 22D (indicating "tens" of ounces and ones of ounces, respectively, in high range mode) displays a legend "OUNCES" to the user.

Furthermore, from a user-friendliness standpoint, an element 22J bearing an appropriate legend (e.g., "LOW") may be provided to indicate that the low range mode of scale operation has been selected by the switch 40, and an element 22K may similarly be provided to indicate to the user that the high range has been selected.

The elements 22A–22D are conveniently seven-segment digital Liquid Crystal Displays (LCD). The elements 22E–22K, are conveniently single-segment LCD devices, in the case of the elements 22E, 22F, 22H, 22I, 22J and 22K appropriately masked with legends but, could also be light-emitting diode devices or vacuum-flourescent devices.

FIG. 3A shows the tolerance vs load criteria for the scale 10 in the low range mode of operation. In this case "d" equals one-tenth ounce. A critical breakpoint on the curve occurs at a load of 500d, which is 50 ounces, or "3" pounds "02.2" ounces (as displayed). For loads up to 50 ounces, load cell compensation (for nonlinearity, hysteresis and creep) must be maintained to a tolerance of d/2, or 1/20 ounce, which is readily achieved with known low order compensation techniques. For loads between 3 pounds 2 ounces and 10 pounds (1600d₁), a tolerance of only d, or 1/10 ounce must be maintained. At the upper limit of the low range, in this example 10 pounds (actually "9" pounds "15.9" ounces, as displayed), an accuracy of only one part in 1600 (1599) need be maintained (equivalent to 0.062% of reading).

FIG. 3B shows the tolerance vs load criteria for the scale 10 in the high range mode of operation. In this case "d" equals one ounce. A critical breakpoint on the curve occurs at a load of 500d, which is 500 ounces, or "31" pounds "04" ounces (as displayed). For loads up to 500 ounces, load cell compensation (for nonlinearity, hysteresis and creep) need be maintained to a tolerance of d/2, or ½ ounce, which is readily achieved with known low order compensation techniques. For loads between 31 pounds 4 ounces and 100 pounds (1600d$_h$) a tolerance of only d, or 1 ounce need be maintained. At the upper limit of the low range, in this example 100 pounds (actually "99" pounds "16" ounces, as displayed), an accuracy of only one part in 1600 need be maintained.

Thus, it is possible to implement a multirange scale that maintains a constant "d" in each of two ranges without encountering onerous tolerance or accuracy problems, thereby enabling the use of an economic load cell and little compensation.

Otherwise, maintaining the low range "d" of 1/10 ounce would require a fifth digit (tenth of ounces) in the high range display of weight. Worse yet, in the high range mode, at d=1/10 ounce a tolerance of d/2, or 1/20 ounce, and accuracies of up to one part in sixteen thousand would be required.

It should be understood that, with regard to the manual switching of load ranges, the output of the microprocessor 20 could be provided to another device, such as a postage meter or parcel register, thereby bypassing the need for a display device for other than weight.

Returning to FIG. 1, the scale 10 is equipped with a keyboard 60 for selecting various operating features of the scale, among which may be the function of the switch 40. For instance, the destination (i.e., zone or zip code) of the article being mailed or shipped may be entered via a number pad 62 on the keyboard. A data bearing element, such as a Programmable Read Only Memory (PROM) 64 is provided in the scale for access by the microprocessor 20 when a zip code is entered and must be "converted", via zip-to-zone tables on the PROM 64, to a destination zone number, such as 1 through 9 (which is typical for parcel shipping). This zone number, whether input directly or derived from a zip code, may be displayed to the user by the display 22 either in the elements 22A–22D shown, or in additional numeric elements (not shown).

The user may also select, via keys 66 on the keyboard 60, a particular carrier for the article; such as the U.S. Postal Service, United Parcel Service, etc. In order for the microprocessor 20 to calculate the appropriate shipping or mailing charge for the article, it accesses another data bearing element, such as a PROM 68 which contains rate tables for rate, in other words charge based on weight, for each zone or zip code. When this charge is calculated, it may be displayed to the user by the display 22, either in the elements 22A–22D shown, or in additional numeric elements (not shown).

Either independently or aggregately, the data supplied by the PROM's 64 and 68 to the microprocessor 20 and the zone calculated by the microprocessor based on the zip-to-zone information is indicative of "rate information" relevant to mailing or shipping an article The above described functions of converting zip code to zone, displaying the zone, and calculating a charge are all known in the art and appear as features on the HAWK(TM) Scale, which is described in commonly-owned U.S. Pat. No. 4,718,506 entitled "PROM CARD ARRANGEMENT FOR POSTAL/SHIPPING SCALE".

Figure 5:
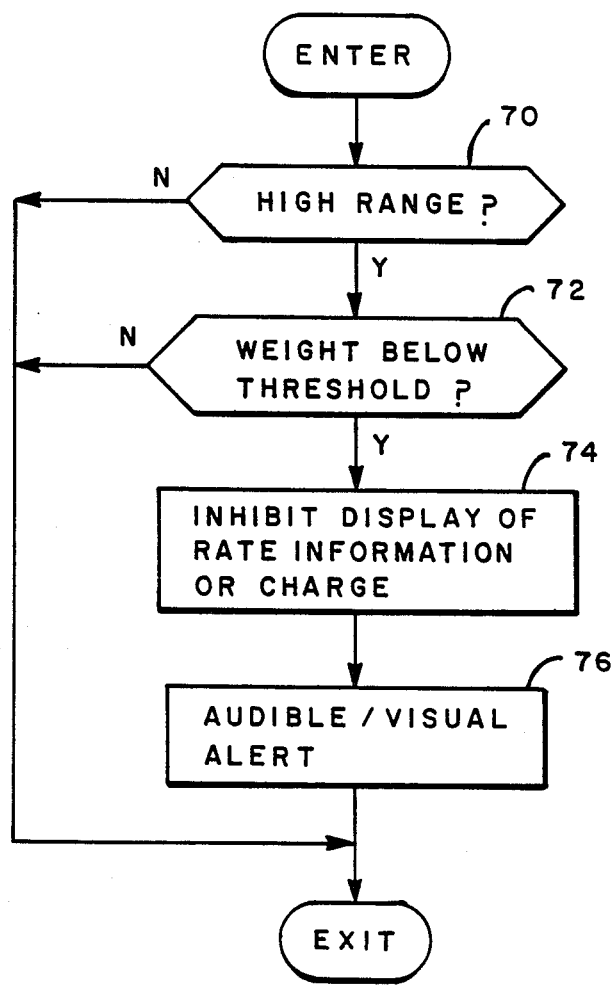
FIG. 5 is a software flowchart of a software routine for operating the scale of FIG. 1.

FIG. 5 shows a software routing for the microprocessor 20. In a step 70 it is determined whether the scale is in the high range mode (e.g., 0–100 pounds) of operation, such as by the position of the switch 40. If so, in a step 72 it is determined whether the weight of the article as indicated by the output of the load cell 18 is below a threshold which is a small percentage, such as 1-5%, of the full range in the high range mode—in this case below 1-5 pounds. If so, the calculation and/or display of zone, and additionally the calculation and/or display of shipping/mailing charge is inhibited. Else, if the scale is in the low range mode, or is in the high range mode and the article weight is at least the threshold, the step 74 is bypassed. One skilled in the art to which this invention pertains will readily recognize how to implement the aforementioned functionality described with respect to FIG. 5 in a particular scale, and will appreciate that the absence of a display in response to keyboard entry of a function will alert the user to a problem in this case the need to switch to the low range mode of operation. It should be understood that inhibiting the calculation and/or display of rate information (e.g. in the step 74) may be accomplished in several ways, such as by inhibiting those calculations in the microprocessor or blocking the microprocessor output from reaching the display, any of which is well within the grasp of one of ordinary skill in the art to which this invention pertains, as dictated by the overall control architecture of a particular scale.

Although when the conditions 70 and 72 are satisfied, the display of rate information and charge are inhibited, "raw" weight may still be displayed.

In addition to inhibiting the calculation and/or display of zone and/or charge when an article of below a threshold weight is being weighed in the high range mode of operation, it may be desirable to more positively alert the user to this "forbidden" operation of the scale—for instance, in a step 76 by causing the element 22J to blink on and off vigorously.

It is pertinent to note that sometimes a scale is connected directly to a postage meter or a parcel register, in which case many of the display functions described hereinbefore may be absent and the calculation of charge or other rate information would nevertheless be inhibited. In this case, it is also possible to provide an audible alert in the step 76 to the user of the need to switch over to low range.

I claim:

1. An electronic scale for weighing an article, comprising:
   first means for providing an output indicative of the weight of an article;
   a data bearing element for providing rate information relevant to shipping or mailing the article;
   a programmed microprocessor for providing a signal indicative of the charge for mailing or shipping the article in response to the output of the first means and reflecting the information from the data bearing element;
   manually operable switch means coupled to the microprocessor for causing the microprocessor to operate in one of two weighing modes, being a high range mode and a low range mode;
   wherein the microprocessor is inhibited from providing the signal indicative of the charge for mailing or shipping the article when operating in the high range mode and the weight of the article is below a threshold, the threshold being from 1-5% of the full range of the high range mode.

2. An electronic scale according to claim 1, further comprising:
   a display responsive to the output of the first means for displaying the weight of the article and responsive to the signal from the microprocessor for displaying the charge for mailing or shipping the article;

wherein the display is inhibited from displaying the charge for mailing or shipping the article when the scale is operating in the high range mode and the weight of the article is below said threshold.

3. An electronic scale according to claim 2 wherein the display is operable to display the weight of the article independently of displaying the charge for mailing or shipping the article.

4. An electronic scale according to claim 1, further comprising means for audibly or visually alerting the user when the microprocessor is inhibited from providing the signal indicative of the charge for mailing or shipping the article.

5. An electronic scale according to claim 1, wherein:
the microprocessor is operable to provide a signal indicative of rate information for the article; and
wherein the microprocessor is inhibited from providing the signal indicative of the rate information for the article when operating in the high range mode and the weight of the article is below said threshold.

* * * * *